(12) United States Patent
Li

(10) Patent No.: US 7,810,614 B1
(45) Date of Patent: Oct. 12, 2010

(54) SWIVEL DEVICE FOR BICYCLES

(76) Inventor: Kun-Yuan Li, No. 33, Lane 386, Sanfeng Rd., Fengyuan City, Taichung County (TW) 420

( * ) Notice: Subject to any disclaimer, the term of this patent is extended or adjusted under 35 U.S.C. 154(b) by 0 days.

(21) Appl. No.: 12/610,337

(22) Filed: Nov. 1, 2009

(51) Int. Cl.
*B62L 1/00* (2006.01)

(52) U.S. Cl. ........................ 188/2 D; 74/502.6; 280/279

(58) Field of Classification Search .................. 280/279, 280/280; 74/551.1, 502.4, 502.6; 188/2 D, 188/24.11
See application file for complete search history.

(56) References Cited

U.S. PATENT DOCUMENTS

| | | | | |
|---|---|---|---|---|
| 5,605,076 A | * | 2/1997 | Wu | 74/551.1 |
| 5,791,671 A | * | 8/1998 | Tang et al. | 280/264 |
| 6,220,398 B1 | * | 4/2001 | Wu | 188/24.11 |
| 6,224,079 B1 | * | 5/2001 | Goring | 280/279 |
| 6,408,714 B1 | * | 6/2002 | Kuo | 74/551.1 |
| 6,422,353 B1 | * | 7/2002 | Lin | 188/24.11 |

\* cited by examiner

*Primary Examiner*—Christopher P Schwartz

(57) ABSTRACT

A swivel device for bicycles includes a first ring adapted to be mounted on a head tube of a bicycle. The first ring has a plurality of first protrusions formed thereon. Each first protrusion connects to a first brake cable. A second ring is adapted to be mounted on the head tube. The second ring has a plurality of second protrusions formed thereon. Each second protrusion connects to a second brake cable. A positioning sleeve encloses the first and the second rings for positioning the first and the second rings in place. The first ring is able to pivotally swivel relative to the second ring. When braking, the second brake cables dragged to lift the second ring upwardly and the first ring moved upwardly to drag the first brake cables upwardly.

5 Claims, 4 Drawing Sheets

SWIVEL DEVICE FOR BICYCLES

BACKGROUND OF THE INVENTION

1. Field of the Invention

The present invention relates to a swivel device for bicycles, and more particularly to a swivel device provided for freely swiveling a handlebar of a bicycle without a limitation of brake cables.

2. Description of Related Art

A conventional braking device for bicycle in accordance with the prior art comprises a braking device mounted on a bicycle for braking a front and a rear wheel simultaneously. The braking device comprises two brake levers connected to a handlebar, and two brake wires respectively connected to the two brake levers. The two brake wires pass through a head tube of the bicycle to respectively connect to a front brake and a rear brake which are respectively mounted on the front wheel and the rear wheel. A head tube relay is received in the head tube. A fixing device is mounted on the head tube relay for securely fixing the two brake wires together inside the head tube relay. When either brake lever is manipulated, the front and the rear brakes are actuated simultaneously.

However, the conventional braking device for bicycle suffers from a disadvantage. The handlebar often swivels about the head tube, but the two brake wires which are connected to the handlebar and fixed by the fixing device may tangle with each other. Even the front and rear brakes are able to be actuated simultaneously, the two brake wires limits a rotation of the handlebar. Therefore, it is inconvenient to freely swivel the handlebar of the bicycle when riding or stunt riding.

The present invention has arisen to mitigate and/or obviate the disadvantages of the conventional braking device for bicycle.

SUMMARY OF THE INVENTION

The main objective of the present invention is to provide an improved swivel device for bicycles.

To achieve the objective, a swivel device for bicycles in accordance with the present invention comprises a first ring movably coaxially adapted to be mounted on a head tube of a bicycle, and a second ring movably coaxially adapted to be mounted on the head tube and locating below the first ring. The second ring is swivelably enclosed and retrained by the first ring.

The first ring has a plurality of first protrusions formed on a bottom thereof and extending axially downwardly therefrom. The first protrusions project from a bottom of the second ring. Each of the first protrusions is L-shaped. Each first protrusion has a first holding portion formed on one free end thereof and extending inwardly therefrom for connecting to a first brake cable. Each first brake cable has a first block formed on one end thereof for buckling to the first holding portion. The first ring has a first annular flange formed on the inner periphery thereof and extending inwardly therefrom.

The second ring has a plurality of second protrusions formed on a top thereof and extending axially upwardly therefrom. The second protrusions pass through the first ring and project from a top of the first ring. Each of the second protrusions is L-shaped. Each second protrusion has a second holding portion formed on one free end thereof and extending outwardly therefrom for connecting to a second brake cable. Each second brake cable has a second block formed on one end thereof for buckling to the second holding portion. The second ring has a second annular flange formed on the outer periphery thereof and extending outwardly therefrom. The first annular flange is movably buckled to the second annular flange for pivotally connecting the first ring and the second ring.

A positioning sleeve is mounted on the head tube and encloses the first and the second rings for positioning the first and the second rings in place and protecting the first and the second rings from being worn. The positioning sleeve has a plurality of passages defined in a periphery thereof and extending through the periphery thereof for corresponding to the first ring. Each first brake cable is inserted into a corresponding passage to connect with the first ring within the positioning sleeve.

Moreover, a plurality of balls is annularly disposed between the first ring and the second ring, wherein the first ring is able to pivotally smoothly swivel relative to the second ring. An outer diameter of the first block is relatively greater than a gap between the first holding portion and the head tube. An outer diameter of the second block is relatively greater than a gap between the second holding portion and the positioning sleeve.

Accordingly, the first ring is able to pivotally swivel relative to the second ring. When braking, the second brake cables are dragged to simultaneously lift the second ring upwardly along the head tube. The first ring is moved upwardly by the lifted second ring to simultaneously drag the first brake cables upwardly.

Further benefits and advantages of the present invention will become apparent after a careful reading of the detailed description with appropriate reference to the accompanying drawings.

DETAILED DESCRIPTION OF THE INVENTION

Figure 1:
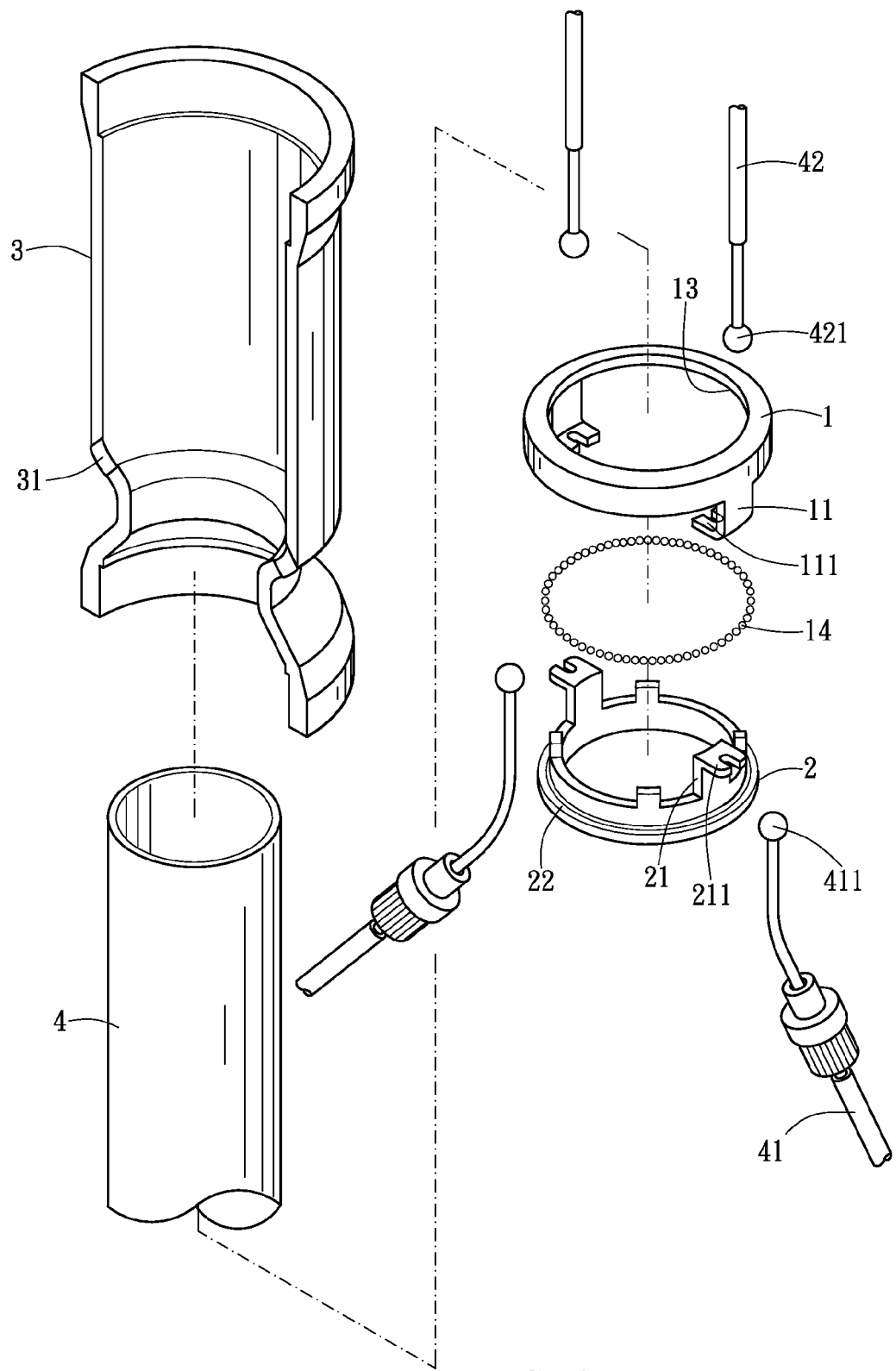
FIG. 1 is an exploded perspective view of a preferred embodiment of a swivel device for bicycles in accordance with the present invention.
Figure 2:
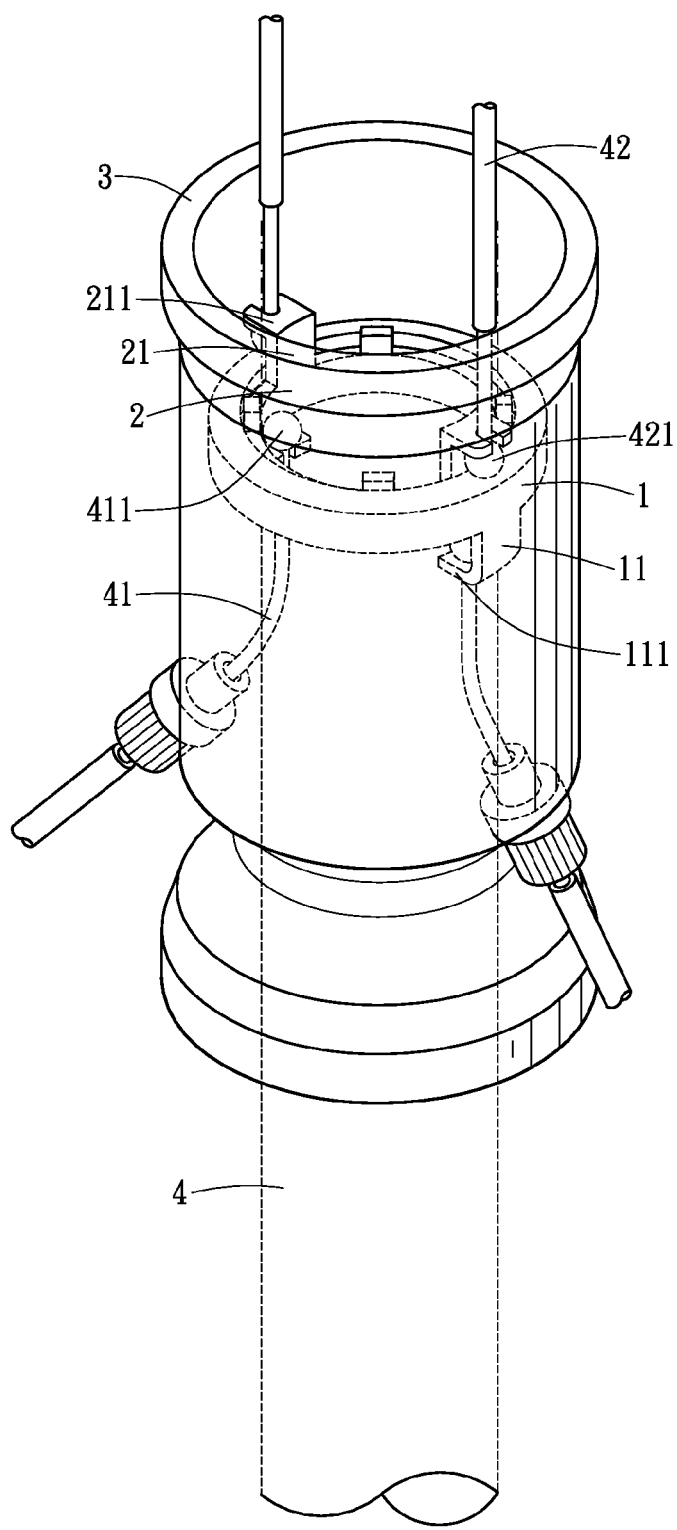
FIG. 2 is an assembled perspective view of the preferred embodiment of the swivel device for bicycles in accordance with the present invention.
Figure 3:
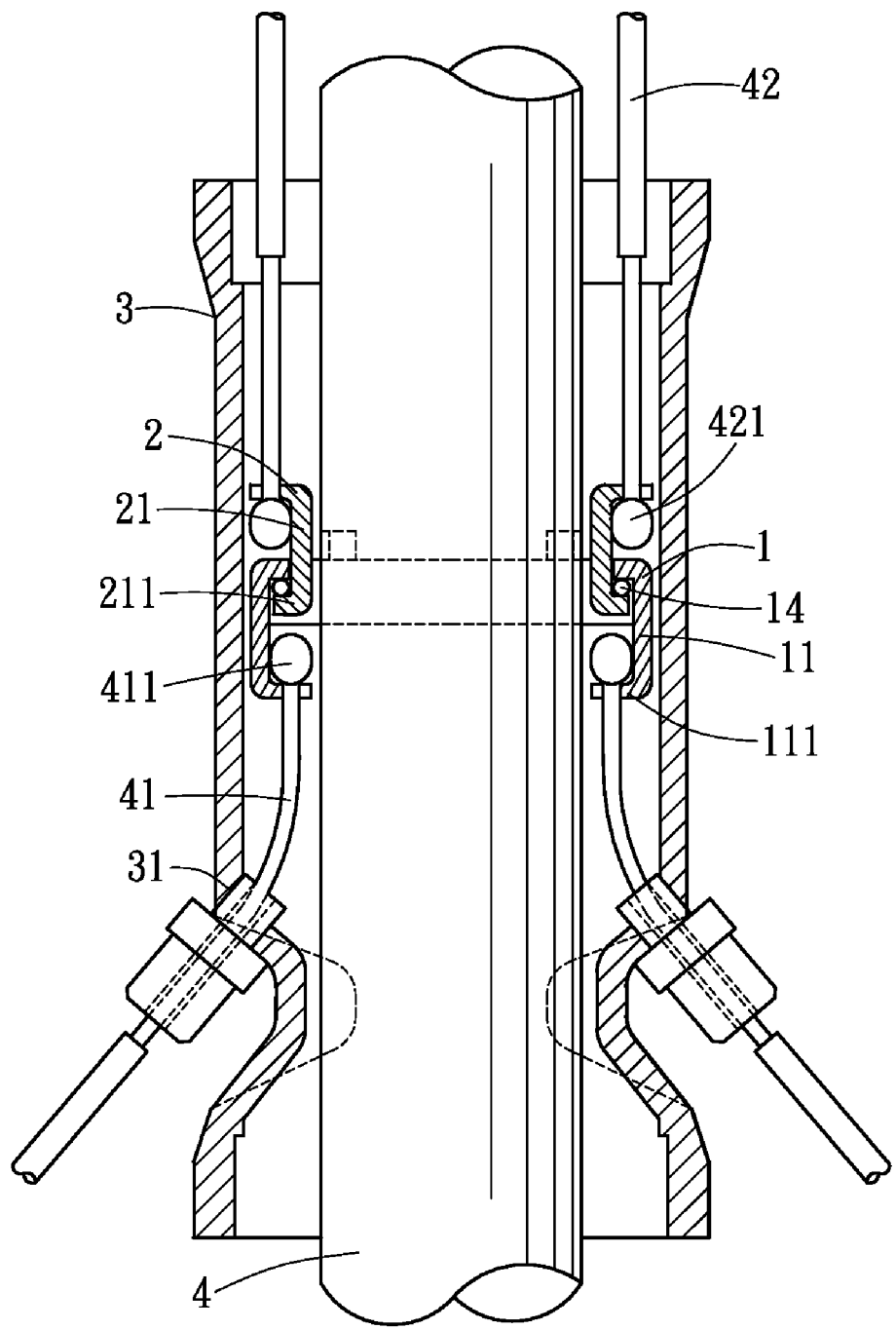
FIG. 3 is a partial cross-sectional view of the preferred embodiment of the swivel device for bicycles in accordance with the present invention.

Referring to the drawings and initially to FIGS. 1-3, a swivel device for bicycles in accordance with the present invention comprises a first ring 1 movably coaxially mounted on a head tube 4 or a handlebar stem (not shown) of a bicycle, and a second ring 2 movably coaxially mounted on the head tube 4 and locating below the first ring 1. The second ring 2 is swivelably enclosed and retrained by the first ring 1. A positioning sleeve 3 is mounted on the head tube 4 or the handlebar stem (not shown) and encloses the first and the second rings 1, 2.

The first ring 1 has a plurality of first protrusions 11 formed on a bottom thereof and extending axially downwardly therefrom. The first protrusions 11 project from a bottom of the second ring 2. In a preferred embodiment, the first ring 1 has two first protrusions 11 diametrically formed thereon. Each first protrusion 11 is L-shaped. Each first protrusion 11 has a first holding portion 111 formed on one free end thereof and extending inwardly therefrom for connecting to a first brake cable 41 which is adapted to connect to a front brake (not shown) or a rear brake (not shown) of the bicycle. Each of the two first brake cables 41 has a first block 411 formed on one end thereof and buckled to the first holding portion 111. Each first block 411 is received between the first protrusion 11 and an outer periphery of the head tube 4. The first ring 1 has a first annular flange 13 formed on the inner periphery thereof and extending inwardly therefrom.

The second ring 2 has a plurality of second protrusions 21 formed on a top thereof and extending axially upwardly therefrom. The second protrusions 21 pass through the first ring 1 and project from a top of the first ring 1. In the preferred embodiment, the second ring 2 has two second protrusions 21 diametrically formed thereon. Each second protrusion 21 is L-shaped. Each second protrusion 21 has a second holding portion 211 formed on one free end thereof and extending outwardly therefrom for connecting to a second brake cable 42 which is adapted to a brake lever (not shown) of the bicycle. Each of the two second brake cables 42 has a second block 421 formed on one end thereof and buckled to the second holding portion 211. Each second block 421 is received between the second protrusion 21 and an inner periphery of the positioning sleeve 3. The second ring 2 has a second annular flange 22 formed on the outer periphery thereof and extending outwardly therefrom for swivelably buckling to the first annular flange 13.

The positioning sleeve 3 encloses the first and the second rings 1, 2 for positioning the first and the second rings 1, 2 in place and protecting the first and the second rings 1, 2 from being worn. The positioning sleeve 3 has a plurality of passages 31 defined in a periphery thereof and extending through the periphery thereof. In the preferred embodiment, the positioning sleeve 3 has two passages 31 diametrically defined therein and corresponding to the two first protrusions 11 of the first ring 1. The two first brake cables 41 are respectively inserted into the two passages 31. The two first brake cables 41 respectively connect with the two first protrusions 11 of the first ring 1 within the positioning sleeve 3.

Accordingly, a plurality of balls 14 is annularly disposed between the first annular flange 13 and the second annular flange 22 when the first annular flange 13 is buckled to the second annular flange 22, such that the first ring 1 is able to pivotally smoothly swivel relative to the second ring 2. When a handlebar (not shown) freely rotates about the head tube 4 or the handlebar stem, the two first brake cables 41 do not tangle with the two second brake cables 42.

Moreover, an outer diameter of the first block 411 of each first brake cable 41 and an outer diameter of each first brake cable 41 are relatively greater than a gap between the first holding portion 111 and the head tube 4. An outer diameter of the second block 421 of each second brake cable 42 and an outer diameter of each second brake cable 42 are relatively greater than a gap between the second holding portion 211 and the positioning sleeve 3. Therefore, the two first blocks 411 are confined by the outer periphery of the head tube 4 and respectively securely buckled to the two first holding portions 111 for preventing the two first blocks 411 detaching from the two first holding portions 111. The two second blocks 421 are confined by the inner periphery of the positioning sleeve 3 and respectively securely buckled to the two second holding portions 211 for preventing the two second blocks 421 detaching from the two second holding portions 211.

Figure 4:
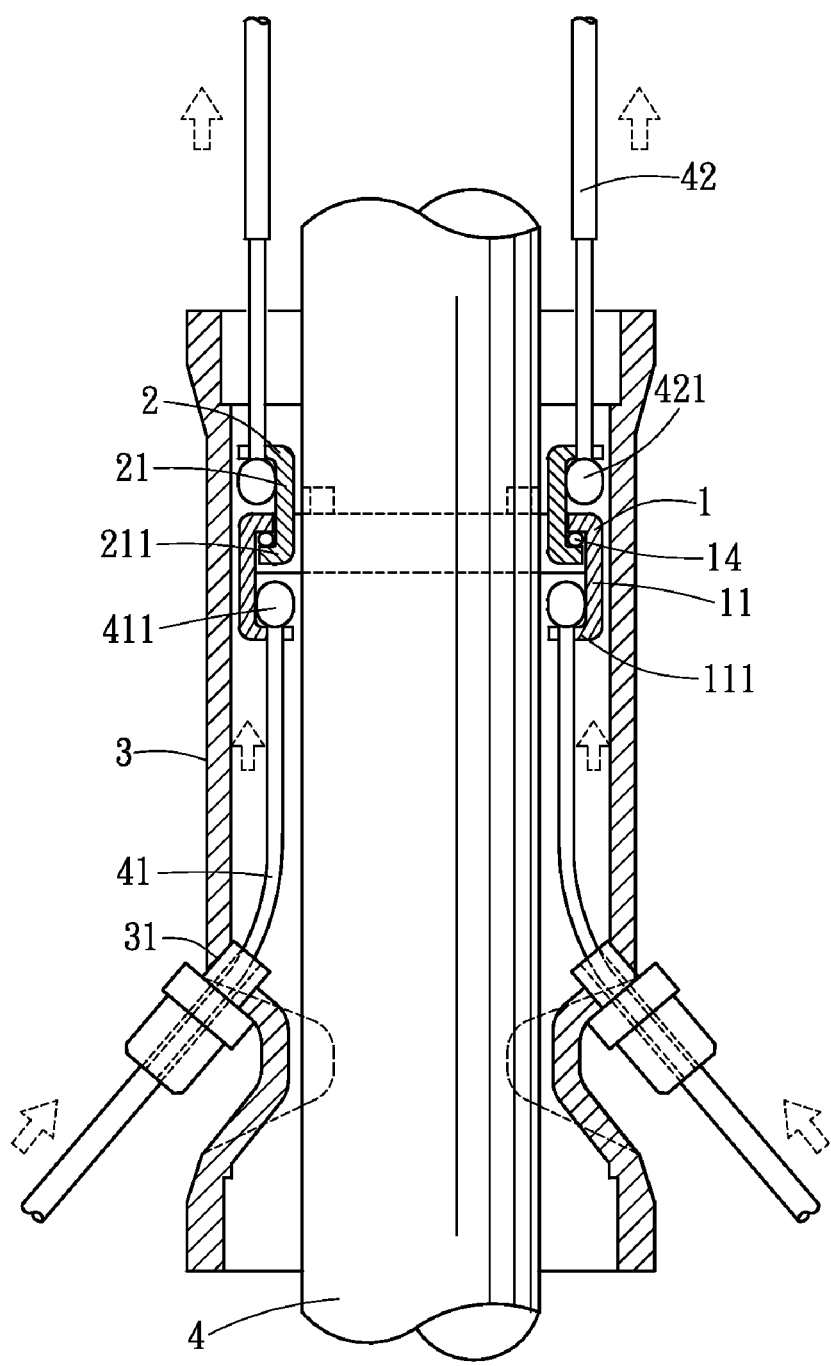
FIG. 4 is a partial cross-sectional view of the preferred embodiment of the swivel device for bicycles in accordance with the present invention when braking.

As shown in FIG. 4, the operation of the swivel device for bicycles in accordance with the present invention will be described in detailed below. When manipulating either brake lever, the corresponding second brake cable 42 is dragged. The second ring 2 is simultaneously and smoothly lifted along the head tube 4 due to the two diametrical second protrusions 21 which are respectively buckled to the two second brake cables 42. The first ring 1 is simultaneously moved upwardly by the lifted second ring 2 so as to lift the two first brake cables 41 up for driving the front brake (not shown) or the rear brake (not shown) to stop the bicycle.

Although the invention has been explained in relation to its preferred embodiment, it is to be understood that many other possible modifications and variations can be made without departing from the spirit and scope of the invention as hereinafter claimed.

What is claimed is:

1. A swivel device for bicycles comprising:

a first ring movably coaxially adapted to be mounted on a head tube of a bicycle, the first ring having a plurality of first protrusions formed on a bottom thereof and extending axially downwardly therefrom, each first protrusion connected to a first brake cable;

a second ring movably coaxially adapted to be mounted on the head tube of the bicycle and locating below the first ring, the second ring swivelably enclosed and retrained by the first ring, the second ring having a plurality of second protrusions formed on a top thereof and extending axially upwardly therefrom, each second protrusion connected to a second brake cable, wherein when the first ring engages with the second ring, the first protrusions projecting from a bottom of the second ring, the second protrusions passing through the first ring and projecting from a top of the first ring; and a positioning sleeve mounted on the head tube and enclosing the first and the second rings for positioning the first and the second rings in place and protecting the first and the second rings from being worn, the positioning sleeve having a plurality of passages defined in a periphery thereof and extending through the periphery thereof for corresponding to the first ring, each first brake cable inserted into a corresponding passage to connect with the first ring within the positioning sleeve;

wherein the first ring is able to pivotally swivel relative to the second ring, when braking, the second brake cables dragged to simultaneously lift the second ring upwardly along the head tube, the first ring moved upwardly by the lifted second ring to simultaneously drag the first brake cables upwardly.

2. The swivel device for bicycles as claimed in claim 1, wherein each of the first and second protrusions is L-shaped, each first protrusion having a first holding portion formed on one free end thereof and extending inwardly therefrom for connecting to a corresponding first brake cable, each second protrusion having a second holding portion formed on one free end thereof and extending outwardly therefrom for connecting to a corresponding second brake cable.

3. The swivel device for bicycles as claimed in claim 2, wherein each first brake cable has a first block formed on one end thereof for buckling to the first holding portion, each second brake cable having a second block formed on one end thereof for buckling to the second holding portion, an outer diameter of the first block relatively greater than a gap between the first holding portion and the head tube, an outer diameter of the second block relatively greater than a gap between the second holding portion and the positioning sleeve.

4. The swivel device for bicycles as claimed in claim 1 further comprising a plurality of balls annularly disposed between the first ring and the second ring, wherein the first ring is able to pivotally smoothly swivel relative to the second ring.

5. The swivel device for bicycles as claimed in claim 1, wherein the first ring has a first annular flange formed on the inner periphery thereof and extending inwardly therefrom, the second ring having a second annular flange formed on the outer periphery thereof and extending outwardly therefrom, the first annular flange movably buckled to the second annular flange for pivotally connecting the first ring and the second ring.

* * * * *